(12) United States Patent
Tsai

(10) Patent No.: US 10,081,922 B1
(45) Date of Patent: Sep. 25, 2018

(54) WATER DIVERTING DEVICE FOR VERTICAL DRAINAGE PIPE

(71) Applicant: Tai-Chun Tsai, Chiayi (TW)

(72) Inventor: Tai-Chun Tsai, Chiayi (TW)

( * ) Notice: Subject to any disclaimer, the term of this patent is extended or adjusted under 35 U.S.C. 154(b) by 0 days.

(21) Appl. No.: 15/857,842

(22) Filed: Dec. 29, 2017

(30) Foreign Application Priority Data

Mar. 23, 2017 (TW) .............................. 106109721 A

(51) Int. Cl.
| | | |
|---|---|---|
| *A01G 29/00* | (2006.01) | |
| *E02B 11/00* | (2006.01) | |
| *E03F 1/00* | (2006.01) | |
| *F16L 41/16* | (2006.01) | |

(52) U.S. Cl.
CPC ............ *E02B 11/005* (2013.01); *E03F 1/002* (2013.01); *F16L 41/16* (2013.01)

(58) Field of Classification Search
CPC ...... A01G 29/00; A01G 25/06; A01G 27/005; E03F 5/0404
USPC .............................................. 405/36, 41, 42
See application file for complete search history.

(56) References Cited

U.S. PATENT DOCUMENTS

| | | | | |
|---|---|---|---|---|
| 3,755,966 A | * | 9/1973 | Smith .................... | A01G 29/00 47/48.5 |
| 4,216,623 A | * | 8/1980 | Silver .................... | A01G 27/02 47/80 |
| 5,975,797 A | * | 11/1999 | Thomas ................. | A01G 25/06 405/36 |
| 5,996,279 A | * | 12/1999 | Zayeratabat ........... | A01G 29/00 47/48.5 |
| 7,707,770 B2 | * | 5/2010 | Liu ........................ | A01G 25/06 405/36 |
| 8,978,296 B2 | * | 3/2015 | Zinger ................... | A01G 29/00 405/45 |
| 9,055,718 B2 | * | 6/2015 | Geerligs ................ | A01G 29/00 |

* cited by examiner

*Primary Examiner* — Brian E Glessner
*Assistant Examiner* — Daniel J Kenny
(74) *Attorney, Agent, or Firm* — Nixon & Vanderhye P.C.

(57) ABSTRACT

A water diverting device is used for fitting inside a porous surrounding wall of a vertical drainage pipe which is deeply inserted into the soil for collecting water from the ground level. The water diverting device includes a tubular wall having at least one slit, and a base wall having at least one drainage port. The drainage port is located at a higher level than a lower slit edge of the slit so as to have a lower level of water accumulated for passing through the slit and an upper open end segment of the porous surrounding wall, thereby soaking the soil near the ground level.

8 Claims, 6 Drawing Sheets

WATER DIVERTING DEVICE FOR VERTICAL DRAINAGE PIPE

CROSS-REFERENCE TO RELATED APPLICATION

This application claims priority from Taiwanese invention patent application no. 106109721, filed on Mar. 23, 2017.

FIELD

The disclosure relates to a water diverting device, more particularly to a water diverting device for a vertical drainage pipe which is deeply inserted into the soil for collecting water from the ground level.

BACKGROUND

As shown in FIG. 1, a grating 9 is mounted on an upper end segment of a vertical drainage pipe 90 for blocking debris from flowing into an accommodation space 902 of the vertical drainage pipe 90. The vertical drainage pipe 90 includes a porous surrounding wall 901 inserted into the soil (not shown) for irrigation or for water infiltration into the soil. Water collected in the accommodation space 902 may permeate through the porous surrounding wall 901 to soak the soil. In this case, the soil at different levels may not be soaked evenly. Especially, when the rainfall amount/frequency is relatively low, the soil near the ground level may become dry for sustained failure to retain sufficient water/moisture thereby rending the land lot unusable for agriculture.

SUMMARY

Therefore, an object of the disclosure is to provide a novel water diverting device by which the soil near the ground level may be soaked even when the rainfall amount/frequency is relatively low.

According to the disclosure, a water diverting device for a vertical drainage pipe is provided. The vertical drainage pipe is to be deeply inserted into the soil for collecting water from the ground level, and has a porous surrounding wall for water to permeate therethrough. The porous surrounding wall extends along a pipe axis to terminate at an upper open end segment and a lower end. The water diverting device includes a tubular wall and a base wall. The tubular wall is configured to be fitted inside the upper open end segment, and extends along the pipe axis to terminate at an upper annular edge and a lower annular edge. The tubular wall has at least one slit extending in a direction of the pipe axis to terminate at an upper slit edge and a lower slit edge. The base wall, together with the tubular wall, defines an accommodation space for receiving water from the ground level, and includes an annular peripheral region, a central elevated region, an intermediate surrounding region, and at least one drainage port. The annular peripheral region is circumferentially joined with the lower annular edge. The central elevated region is elevated relative to the annular peripheral region. The intermediate surrounding region surrounds the pipe axis and extends in the direction of the pipe axis to interconnect the annular peripheral region and the central elevated region. The drainage port is formed in one of the central elevated region and the intermediate surrounding region, and is located at a higher level than the lower slit edge so as to have a lower level of water accumulated for passing through the slit and the upper open end segment of the porous surrounding wall, thereby soaking the soil.

BRIEF DESCRIPTION OF THE DRAWINGS

Other features and advantages of the disclosure will become apparent in the following detailed description of the embodiment(s) with reference to the accompanying drawings, in which.

DETAILED DESCRIPTION

Figure 1:
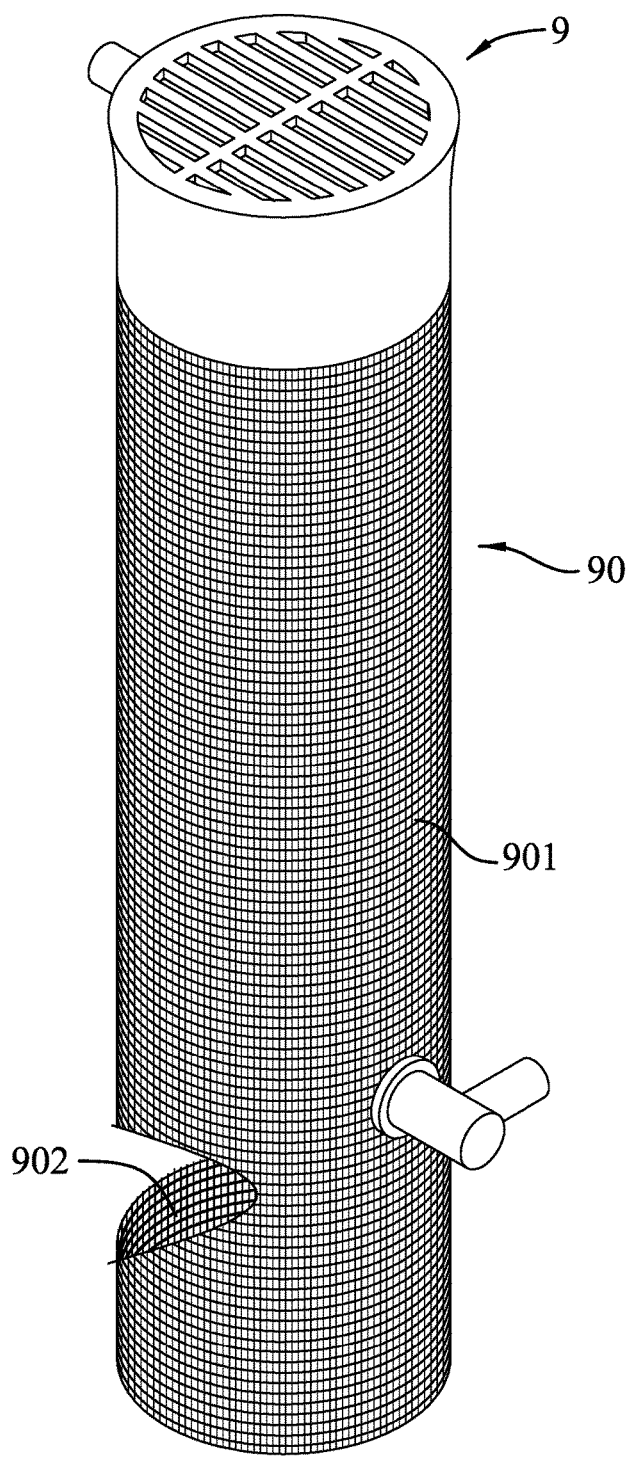
FIG. 1 is a perspective view of a vertical drainage pipe with a conventional grating.

Before the disclosure is described in greater detail, it should be noted that where considered appropriate, reference numerals have been repeated among the figures to indicate corresponding or analogous elements, which may optionally have similar characteristics.

Figure 4:
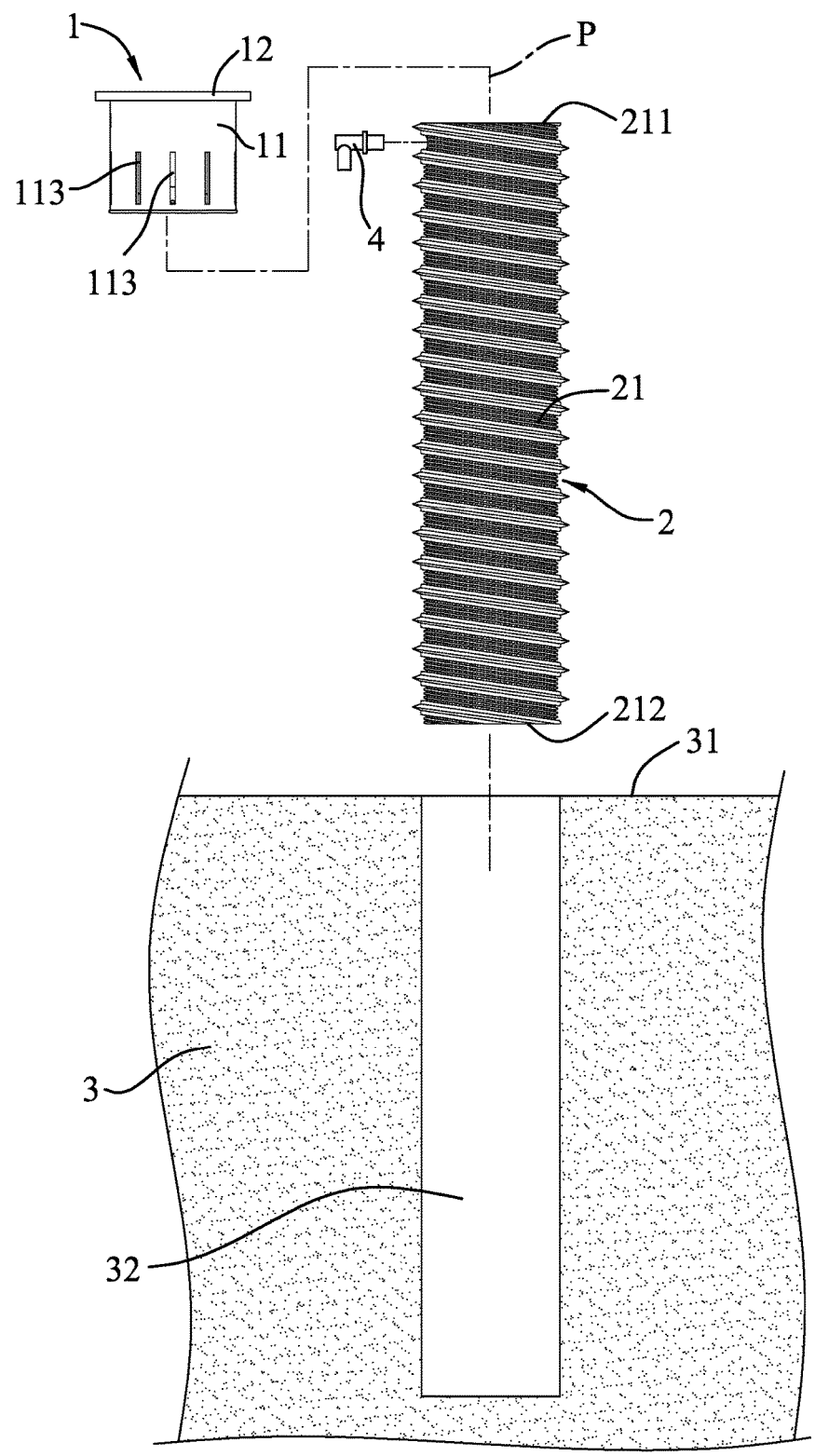
FIG. 4 is an exploded view schematic illustration of the water diverting device used in a vertical drainage pipe.

As shown in FIG. 4, a water diverting device 1 according to a first embodiment of the disclosure is used for a vertical drainage pipe 2 which is to be deeply inserted into the soil 3 for collecting water from the ground level 31, and which has a porous surrounding wall 21 for water to permeate therethrough. The porous surrounding wall 21 extends along a pipe axis (P) to terminate at an upper open end segment 211 and a lower end 212.

Figure 2:
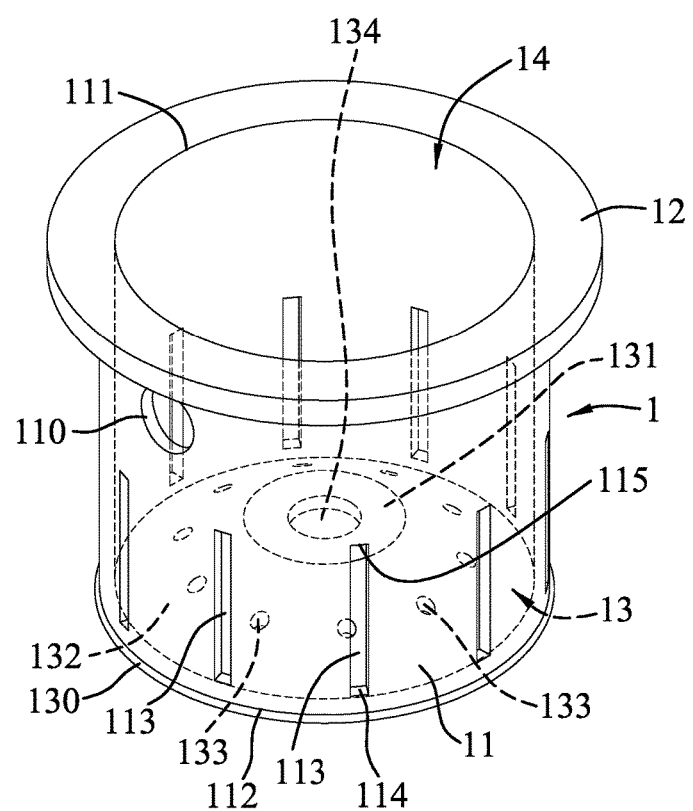
FIG. 2 is a perspective view of a water diverting device according to a first embodiment of the disclosure.
Figure 3:
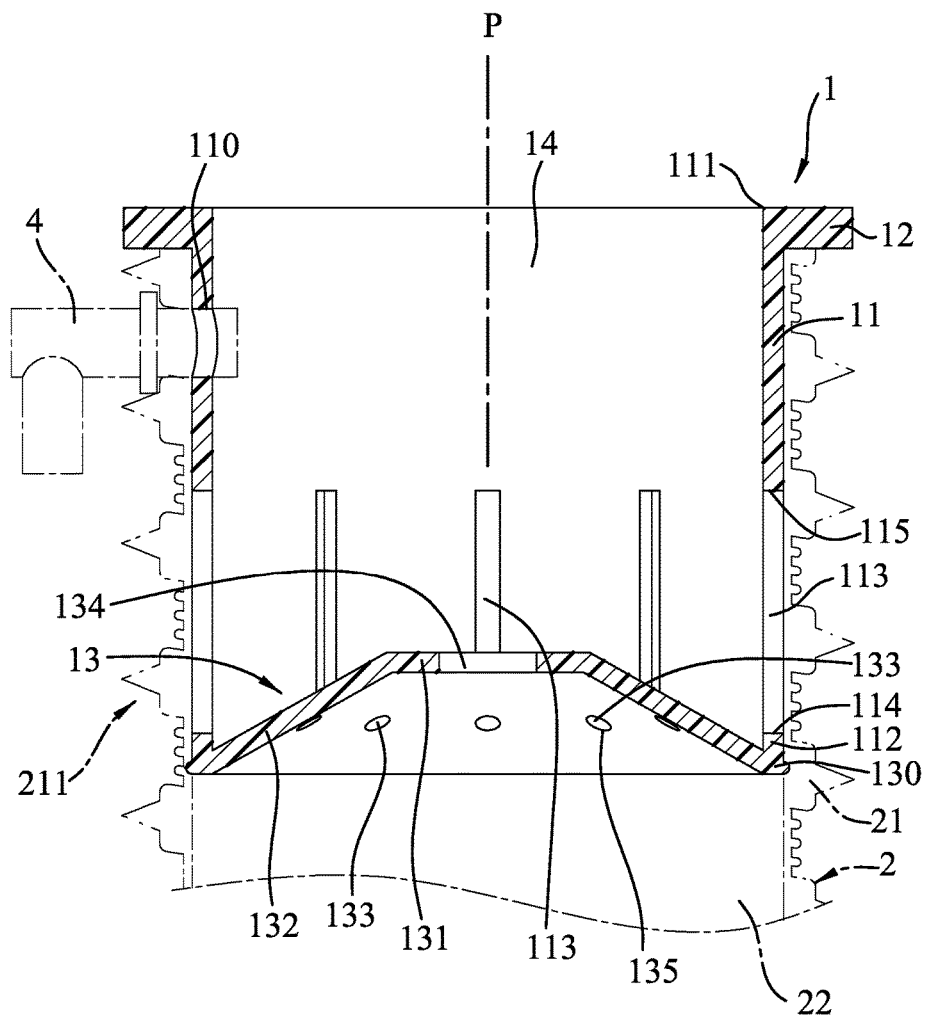
FIG. 3 is a cross-sectional view of the water diverting device of FIG. 2.

Referring to FIGS. 2 and 3, the water diverting device 1 is shown to include a tubular wall 11 and a base wall 13.

The tubular wall 11 is configured to be fitted inside the upper open end segment 211, and extends along the pipe axis (P) to terminate at an upper annular edge 111 and a lower annular edge 112. The tubular wall 11 has at least one slit 113 extending in a direction of the pipe axis (P) to terminate at an upper slit edge 115 and a lower slit edge 114. In this embodiment, the lower slit edge 114 is located adjacent to the lower annular edge 112.

The base wall 13, together with the tubular wall 11, defines an accommodation space 14 for receiving water from the ground level 31. The base wall 13 includes an annular peripheral region 130, a central elevated region 131, an intermediate surrounding region 132, and at least one drainage port 133.

The annular peripheral region 130 is circumferentially joined with the lower annular edge 112. The central elevated region 131 is elevated relative to the annular peripheral region 130. The intermediate surrounding region 132 surrounds the pipe axis (P) and extends in the direction of the pipe axis (P) to interconnect the annular peripheral region 130 and the central elevated region 131.

The drainage port 133 is formed in one of the central elevated region 131 and the intermediate surrounding region 132. The drainage port 133, which has a lower port edge 135, is located at a higher level than the lower slit edge 114 so as to have a lower level of water accumulated for passing through the slit 113 and the upper open end segment 211 of the porous surrounding wall 21, thereby soaking the soil 3.

Therefore, even when the rainfall amount/frequency is relatively low, the soil 3 near the ground level 31 may be soaked. When the rainfall amount is relatively high, the water in the accommodation space 14 may flow into an inner space 22, which is positioned inside the porous surrounding wall 21 and below the water diverting device 1, through the drainage port 133 for soaking the soil 3 at a lower level.

In this embodiment, the intermediate surrounding region 132 diverges from the central elevated region 131 toward the annular peripheral region 130.

In this embodiment, the base wall 13 includes a plurality of the drainage ports 133 and an additional drainage port 134.

The drainage ports 133 are formed in the intermediate surrounding region 132, and are angularly displaced from each other about the pipe axis (P). Each of the drainage ports 133 is located at a lower level than the upper slit edge 115.

The additional drainage port 134 is formed in the central elevated region 131, and has a larger dimension than those formed in the intermediate surrounding region 132.

Although the drainage ports 133, 134 shown in FIGS. 2 and 3 are in the shape of circular opening, the drainage ports 133 may be of the same or different shape openings, such as rectangular, triangle, ellipse, etc. In the case that the tubular wall 11 is circular tube with an inner diameter of 72 mm and that the central elevated region 131 is a circular region with a diameter of 25 mm, the base wall 13 may have ten drainage ports 133 (each being 3 mm in diameter) and the drainage port 134 of 12.7 mm in diameter.

In this embodiment, the tubular wall 11 has a plurality of the slits 113 which are displaced from each other about the pipe axis (P). In the case that the tubular wall 11 is circular in cross-section and has an outer diameter of 74.5 mm and a height of 65 mm, the tubular wall 11 may be formed with ten slits 113 each having a slit width of 3 mm and a slit length of 30 mm.

In this embodiment, the tubular wall 11 has an overflow port 110 which is located adjacent to the upper annular edge 111 at a higher level than the upper slit edge 115 for draining out of overflowing water.

In this embodiment, the water diverting device 1 further includes an outer flange 12 which is configured to extend radially from the upper annular edge 111 to overlie the upper open end segment 211 of the porous surrounding wall 21, and which is flush with the ground level 31.

In a process for installation of the vertical drainage pipe 2 and the water diverting device 1, a hole 32 is dug into the soil 3, the vertical drainage pipe 2 is disposed in the hole 32 to be buried in the soil 3, and the water diverting device 1 is then fitted inside the upper open end segment 211. Optionally, the overflow port 110 may be connected to a drainage tube 4 or be sealed by a film (not shown).

In addition, the accommodation space 14 of the water diverting device 1 may be filled with gravel, thereby blocking debris from flowing through the water diverting device 1.

Figure 5:
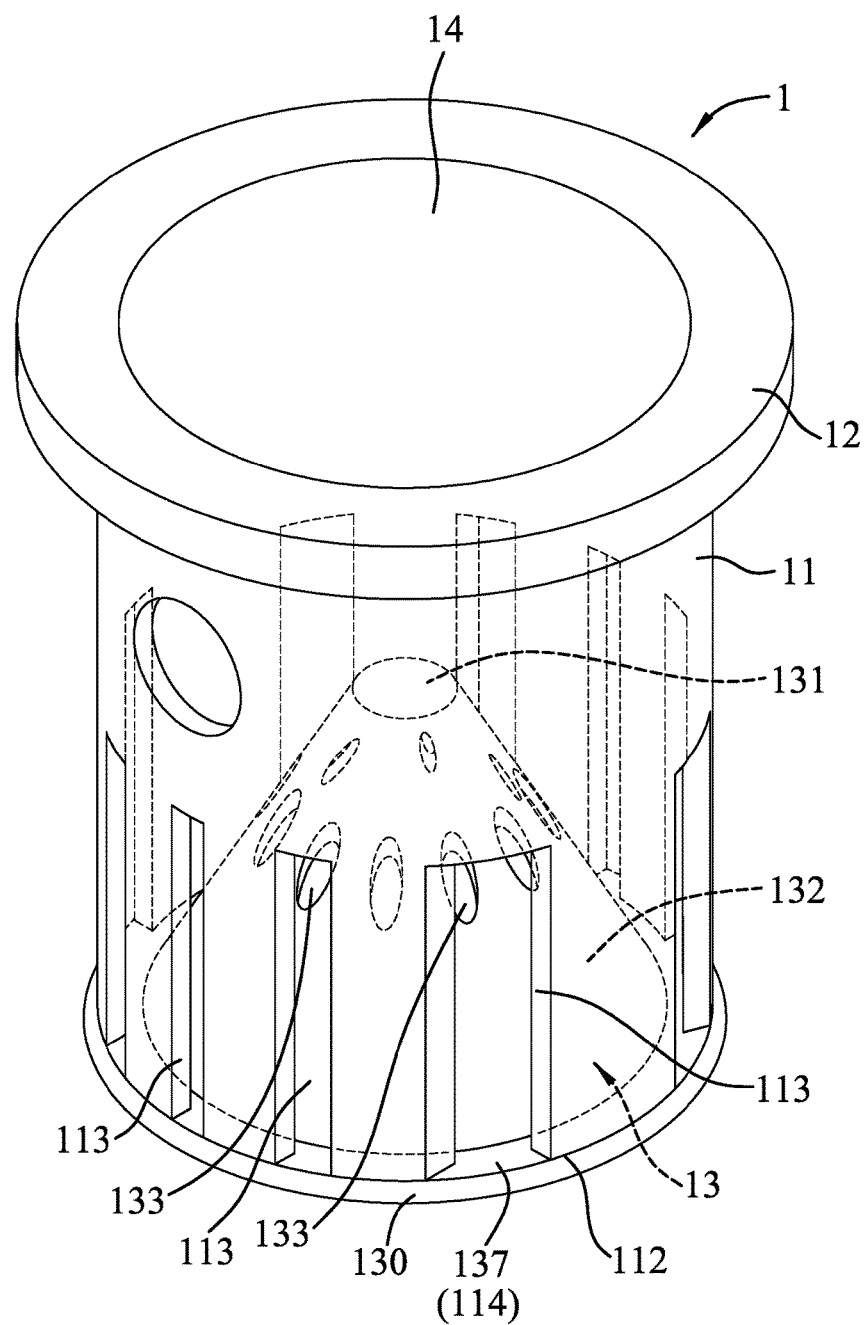
FIG. 5 is a perspective view of a water diverting device according to a second embodiment of the disclosure.
Figure 6:
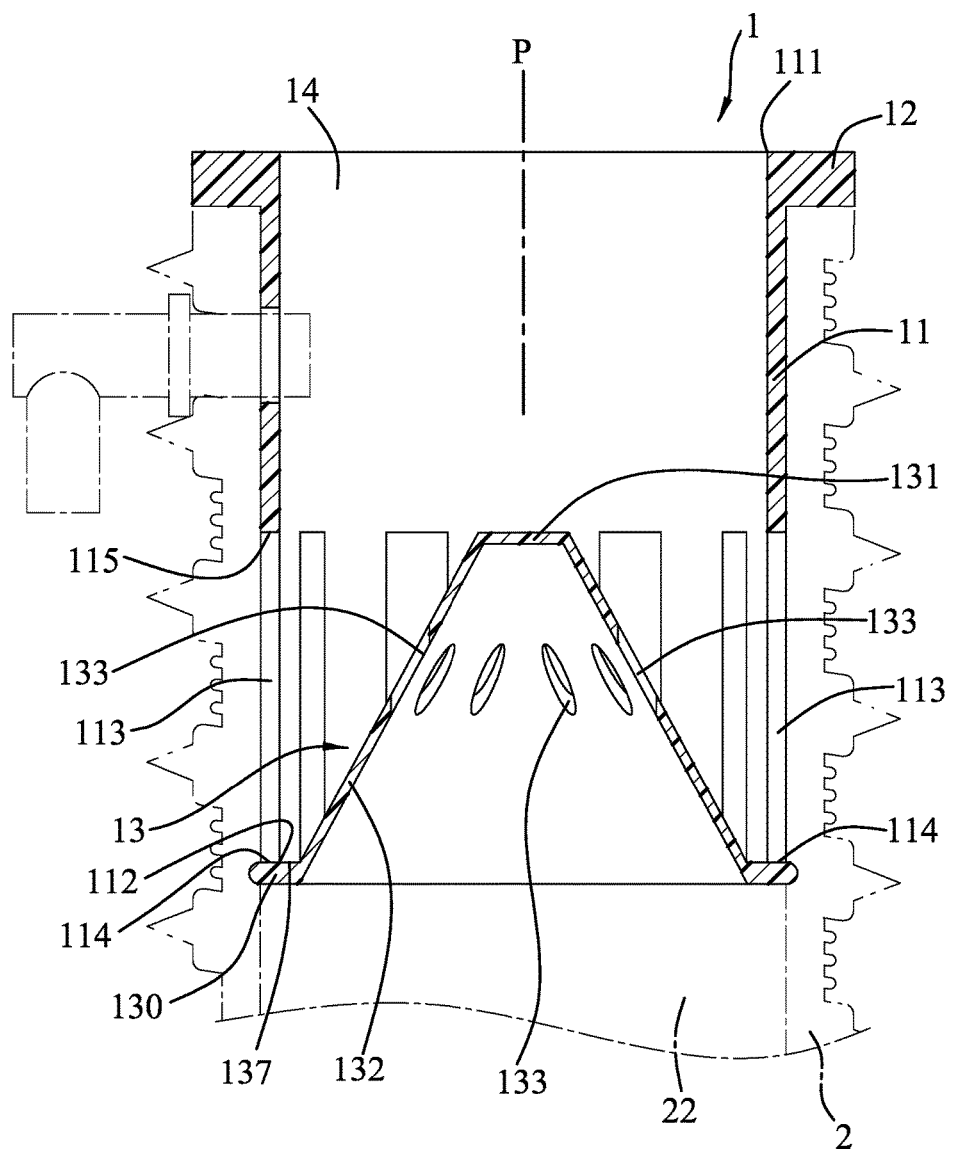
FIG. 6 is a cross-sectional view of the water diverting device of FIG. 5.

FIGS. 5 and 6 illustrate a water diverting device 1 according to a second embodiment of the disclosure. The second embodiment is similar to the first embodiment except that, in the second embodiment, the annular peripheral region 130 extends inwardly and radially beyond the lower annular edge 112, and has an upper annular surface 137 to serve as the lower slit edge 114.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A water diverting device for a vertical drainage pipe which is to be deeply inserted into the soil for collecting water from the ground level, and which has a porous surrounding wall for water to permeate therethrough, the porous surrounding wall extending along a pipe axis to terminate at an upper open end segment and a lower end, said water diverting device comprising:
    a tubular wall configured to be fitted inside the upper open end segment, and extending along the pipe axis to terminate at an upper annular edge and a lower annular edge, said tubular wall having at least one slit extending in a direction of the pipe axis to terminate at an upper slit edge and a lower slit edge; and
    a base wall which, together with said tubular wall, defines an accommodation space for receiving water from the ground level, and which includes
    an annular peripheral region circumferentially joined with said lower annular edge,
    a central elevated region which is elevated relative to said annular peripheral region,
    an intermediate surrounding region which surrounds the pipe axis and which extends in the direction of the pipe axis to interconnect said annular peripheral region and said central elevated region, and
    at least one drainage port which is formed in one of said central elevated region and said intermediate surrounding region, and which is located at a higher level than said lower slit edge so as to have a lower level of water accumulated for passing through said slit and the upper open end segment of the porous surrounding wall, thereby soaking the soil,
wherein
said intermediate surrounding region diverges from said central elevated region toward said annular peripheral region,
said base wall includes a plurality of said drainage ports which are formed in said intermediate surrounding region, and which are angularly displaced from each other about the pipe axis, and
said base wall further include an additional drainage port which is formed in said central elevated region, and which has a larger dimension than those formed in said intermediate surrounding region.

2. The water diverting device according to claim 1, wherein each of said drainage ports is located at a lower level than said upper slit edge.

3. The water diverting device according to claim 1, wherein said tubular wall has a plurality of said slits which are displaced from each other about the pipe axis.

4. The water diverting device according to claim 1, wherein said tubular wall has an overflow port which is located adjacent to said upper annular edge at a higher level than said upper slit edge for draining out of overflowing water.

5. A water diverting device for a vertical drainage pipe which is to be deeply inserted into the soil for collecting water from the ground level, and which has a porous surrounding wall for water to permeate therethrough, the porous surrounding wall extending along a pipe axis to terminate at an upper open end segment and a lower end, said water diverting device comprising:
   a tubular wall configured to be fitted inside the upper open end segment, and extending along the pipe axis to terminate at an upper annular edge and a lower annular edge, said tubular wall having at least one slit extending in a direction of the pipe axis to terminate at an upper slit edge and a lower slit edge;
   a base wall which, together with said tubular wall, defines an accommodation space for receiving water from the ground level, and which includes
   an annular peripheral region circumferentially joined with said lower annular edge,
   a central elevated region which is elevated relative to said annular peripheral region,
   an intermediate surrounding region which surrounds the pipe axis and which extends in the direction of the pipe axis to interconnect said annular peripheral region and said central elevated region, and
   at least one drainage port which is formed in one of said central elevated region and said intermediate surrounding region, and which is located at a higher level than said lower slit edge so as to have a lower level of water accumulated for passing through said slit and the upper open end segment of the porous surrounding wall, thereby soaking the soil; and
   an outer flange which is configured to extend radially from said upper annular edge to overlie the upper open end segment of the porous surrounding wall.

6. The water diverting device according to claim 5, wherein, in use, said outer flange is flush with the ground level.

7. A water diverting device for a vertical drainage pipe which is to be deeply inserted into the soil for collecting water from the ground level, and which has a porous surrounding wall for water to permeate therethrough, the porous surrounding wall extending along a pipe axis to terminate at an upper open end segment and a lower end, said water diverting device comprising:
   a tubular wall configured to be fitted inside the upper open end segment, and extending along the pipe axis to terminate at an upper annular edge and a lower annular edge, said tubular wall having at least one slit extending in a direction of the pipe axis to terminate at an upper slit edge and a lower slit edge; and
   a base wall which, together with said tubular wall, defines an accommodation space for receiving water from the ground level, and which includes
   an annular peripheral region circumferentially joined with said lower annular edge,
   a central elevated region which is elevated relative to said annular peripheral region,
   an intermediate surrounding region which surrounds the pipe axis and which extends in the direction of the pipe axis to interconnect said annular peripheral region and said central elevated region, and
   at least one drainage port which is formed in one of said central elevated region and said intermediate surrounding region, and which is located at a higher level than said lower slit edge so as to have a lower level of water accumulated for passing through said slit and the upper open end segment of the porous surrounding wall, thereby soaking the soil,
   wherein said annular peripheral region extends inwardly and radially beyond said lower annular edge.

8. The water diverting device according to claim 7, wherein said annular peripheral region has an upper annular surface to serve as said lower slit edge.

\* \* \* \* \*